United States Patent [19]

Barre

[11] 4,258,486
[45] Mar. 31, 1981

[54] SCOOPER-EXCAVATOR

[76] Inventor: Marcel J. C. Barre, 3 rue de la Mare, 95160 Montmorency, France

[21] Appl. No.: 80,717

[22] Filed: Oct. 1, 1979

[30] Foreign Application Priority Data

Oct. 4, 1978 [FR] France ............................... 78 28333

[51] Int. Cl.³ ............................................. E02F 3/24
[52] U.S. Cl. ..................................... 37/190; 180/6.2; 198/307
[58] Field of Search ................................. 37/189–190, 37/94–97; 180/6.2, 6.26, 6.3, 6.32; 198/307; 414/487

[56] References Cited

U.S. PATENT DOCUMENTS

| | | | |
|---|---|---|---|
| 3,423,859 | 1/1969 | Swisher, Jr. et al. ............ | 37/190 X |
| 3,500,563 | 3/1970 | Smith .................................... | 37/190 |
| 3,500,987 | 3/1970 | Smith .................................... | 37/190 X |
| 3,746,150 | 7/1973 | Briggs ................................... | 37/190 |

*Primary Examiner*—E. H. Eickholt
*Attorney, Agent, or Firm*—Sughrue, Rothwell, Mion, Zinn and Macpeak

[57] ABSTRACT

The scooper-excavator is self-propelling and comprises a chassis having a roughly U-shape in its horizontal plane. A bucket-wheel is mounted to be rotatable about a horizontal axis which is fixed relative to the chassis and is engaged at least partly between the branches of the chassis. Discharge means are mounted on the chassis to discharge the product scooped by the bucket-wheel. The scooper-excavator is supported on the ground by three support means which define in the aforementioned horizontal plane three bearing points located at the corners of an isosceles triangle. Those of the support means corresponding to the corners at the base of the isosceles triangle are, in the course of the work of the scooper-excavator, permanently driving means and orientable about respective vertical axes. These driving and orientable means are located on each side of the chassis and respectively associated with the branches of the chassis. Means are provided for orienting the respective driving support means and comprise, on one hand, an actuating device connected to the driving support means by mechanical connections, and, on the other hand, a control device which is accessible to the operator and connected to the actuating device for achieving a permanent regulation of the orientation of the driving support means. The angle of orientation of one of the driving means is always equal to and of opposite direction to the angle of orientation of the other driving means.

9 Claims, 10 Drawing Figures

FIG_2

SCOOPER-EXCAVATOR

The present invention relates to a scooper-excavator for use in the formation of an embankment, in public works or for reclaming or extraction of heaped materials, for example for acting on a stock of such products or for the extraction in open-work mines.

French patent No. 680 030 discloses a machine for gathering and loading heavy harvested products comprising a chassis having roughly the shape of a U in its horizontal plane, a bucket-wheel which rotates about itself and is mounted to be rotatable about a horizontal axis which is fixed relative to said chassis while it is at least partly engaged between the branches of said chassis, and discharging means rigid with the chassis and adapted to discharge the product taken up by the bucket-wheel.

The chassis of this known machine is mounted on four wheels which are arranged on two axles and are non-orientable so that this machine can only be used for receiving agricultural products spread on the ground. On the other hand, it cannot be used for taking up the product from a heap of powdered material or more or less large sized pieces (products of extraction from mines, beetroots, etc.) since it could only form a cavity of the width of the bucket-wheel in such a heap until the chassis encounters the front of the heap. Moreover, if the height of the heap exceeds that of the machine, the latter would then be rapidly covered by a sliding of the slope as soon as the cavity has been formed. This machine is therefore useless for carrying out the work mentioned at the beginning of the present specification.

For carrying out such works, machines are also known (French patent No. 2 018 094) which comprise a chassis mounted on trucks having articulated tracks and a bucket-wheel which is mounted at the end of a boom. The latter comprises an endless conveyor whereby it is possible to discharge the product taken up by the bucket-wheel and pour it onto a second conveyor which loads a truck, a fixed endless conveyor or other means. In the course of the operation of the machine, the tracks may be placed and blocked in such manner that the boom is capable of sweeping across the slope worked on by pivoting about a vertical axis defined by one of the tracked trucks, so that the slope has a curved shape.

Further, the scooping force of the wheel (which may be for example 5 metric tons) is transmitted by the boom to the chassis. Bearing in mind the length of a boom, the effect of the bucket-wheel multiplied by the leverage of the overhanging boom, requires a very heavy bearing force of the machine on the ground (for example 55 metric tons) which consequently results in the construction of a heavy machine (of the order of 50 tons). In order to avoid excessively increasing its weight, a relatively small bucket-wheel is chosen, for example a wheel of 2.5 meters. This results in three drawbacks. Firstly, as the bucket-wheel is small, the hourly output of the apparatus is limited and can hardly exceed 350 to 400 tons/hour in the chosen example. Secondly, also owing to its small size, the diameter of the wheel is very often much less than the height of the heap of material to be treated and this requires doubling and even tripling the passages on a single excavation front. Thirdly, the small diameter of the wheel results in the use in the wheel of a hopper having a small slope which renders the apparatus useless when the product is sticky.

Further, in order to obtain a certain configuration of the trucks having articulated tracks, which are three in number, which renders a scooping by sweeping across the heap possible, the machine of French patent No. 2 018 094 comprises special raising devices for raising the chassis so as to disengage the tracked trucks from the ground. Two of them can then be regulated by a pivotal motion about vertical axes through equal but opposite angles relative to the longitudinal axis of the machine, after which the trucks are blocked against vertical pivoting and the raising means are actuated for lowering the machine. It is obvious that with these long and complicated procedures the operation of the machine is not easy and for a chosen configuration (for working in translation parallel to the heap or by a "sweeping" motion), the machine can only work in accordance with the manner set by this configuration.

An object of the invention is to provide a machine employing a bucket-wheel mounted directly on the chassis, that is to say without the use of a boom, which has such mobility that it can be steered in the course of the work even in front of a heap of bulk product, by a simple control located for example in the control cab of the machine.

Consequently the invention provides a self-propelling scooper-excavator comprising a chassis which has roughly the shape of a U in its horizontal plane, a bucket-wheel rotating about itself and mounted to be rotatable about a horizontal axis which is fixed relative to said chassis while being engaged at least partly between the branches of the chassis, and discharge means mounted on the chassis and adapted to discharge the product scooped by the bucket-wheel, wherein the scooper-excavator comprises three support means defining in said horizontal plane three bearing points located at the corners of an isosceles triangle, those of the support means corresponding to the corners at the base of the triangle being in the course of the work of the machine permanently driving means and orientable about respective vertical axes, said driving and orientable means being located on each side of the chassis and respectively associated with the branches of the chassis, the machine further comprising means for orienting the respective driving support means and comprising, on one hand, an actuating device connected to the latter means by mechanical connections and, on the other hand, a control device which is accessible to the operator and connected to said actuating device for achieving a permanent regulation of the orientation of the driving support means, the angle of orientation of one of the driving means always being equal to and of opposite direction relative to that of the other driving means.

Owing to these features, the driver of the machine may always orient the bucket-wheel so that it is perpendicular to the front of the heap of product, even if this front is sinuous, by steering by means of a pivoting of the orientable support means. Under these conditions, he can act on the depth of the passage of the machine while the latter moves in lateral translation in front of the front of the heap.

Further features and advantages of the invention will be apparent from the ensuing description which is given solely by way of example with reference to the accompanying drawings in which.

Figure 1:
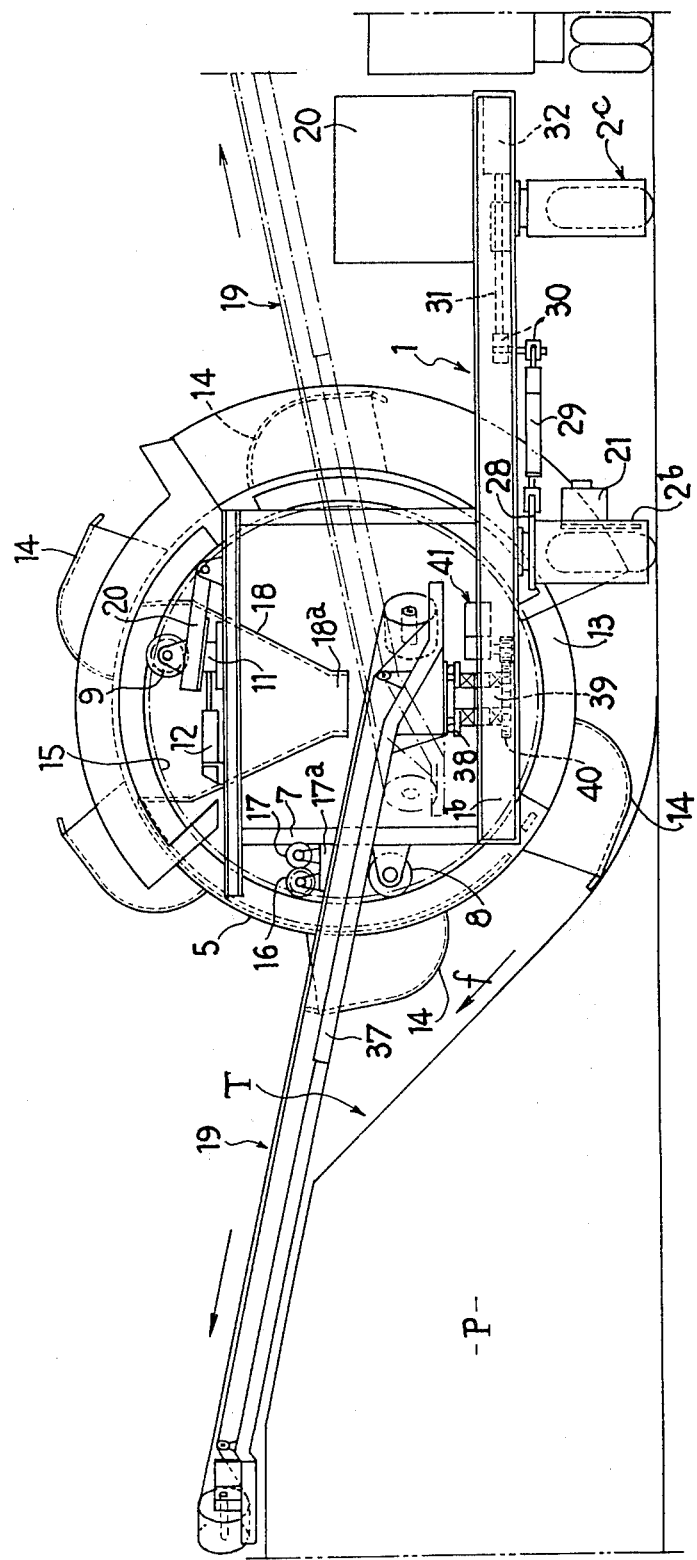
FIG. 1 is a diagrammatic side elevational view of a scooper-excavator according to the invention.
Figure 2:
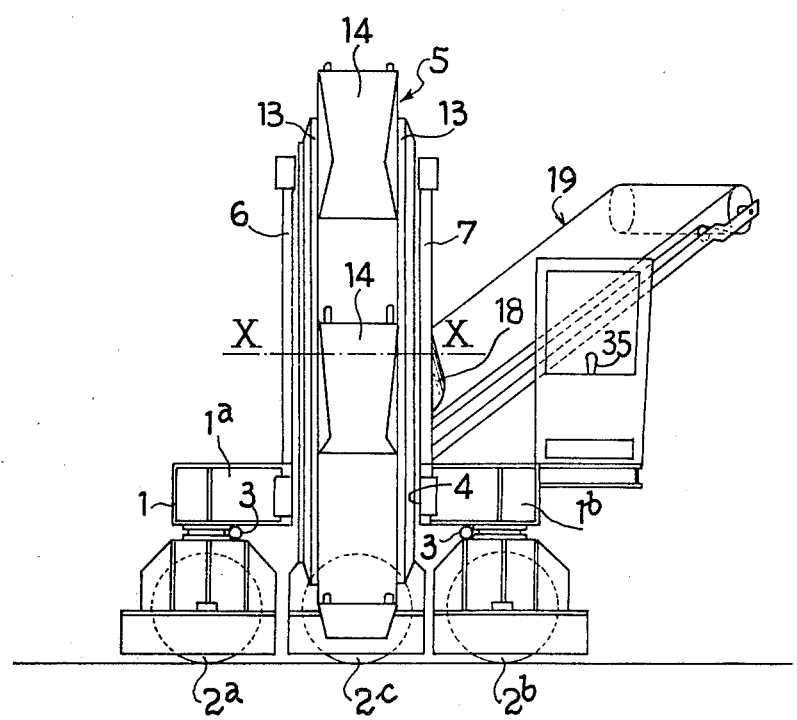
FIG. 2 is a front elevational view of this machine.

The embodiment shown in FIGS. 1 to 5 therefore concerns a scooper-excavator according to the invention which comprises a chassis 1 having a U-shaped configuration in plan and branches 1a and 1b (FIG. 3) which are adapted to extend in the direction of the embankment or slope T from which a product P is to be taken. The chassis 1 is mounted on rolling support means 2a, 2b and 2c which are formed in the illustrated embodiment by wheels having pneumatic tires.

The rolling means 2c is mounted to be fixed relative to the chassis 1 and is consequently non-orientable during operation of the machine. On the other hand, the rolling means 2a and 2b are pivotable relative to the chassis about respective vertical axes. The three rolling means together define three bearing points a, b and c (FIGS. 3 and 5) in the horizontal plane of the chassis 1 located at the corners of an isosceles triangle whose base corners are embodied by the orientable rolling means 2a and 2b.

The space or "notch" 4 defined between the branches in the chassis 1 is occupied by a bucket-wheel 5 which is mounted to rotate about a horizontal axis X—X which extends in a direction parallel to the vertical plane defined by the pivot points a and b of the wheels 2a and 2b.

The bucket-wheel 5 is rotatably mounted on two vertical supports or frames 6 and 7 erected on the chassis 1 on each side of the notch 4 respectively. Each frame 6 and 7 carries a first lower bearing roller 8 and a second upper bearing roller 9, the lower roller being mounted on the outer upright of the frame and the upper roller on the horizontal transverse member of the frame.

The upper roller 9 is mounted on two pivotal arms 10 which are respectively connected to the frames 6 and 7 and bear on the latter through wedges 11 which may be shifted by associated cylinder devices 12 so as to raise and lower the upper rollers 9 for a purpose which will be clear hereinafter.

The bucket-wheel 5 itself has an annular shape and comprises in particular two spaced-apart rings 13 on which are mounted excavating scoops 14 and which respectively bear on the pairs of rollers 8 and 9 which are rotatably mounted on their respective frames 6 and 7. Toothed crown wheels 15 are fixed to each ring 13 and are meshed with a couple of gear pinions 16 driven by a motor 17 and rotatably mounted on supports 17a fixed to the frames 6 and 7. In a modification, the couple of drive pinions 16 may be mounted on the shaft of the lower rollers 8. It will therefore be observed that the bucket-wheel only bears on two generatrices embodied by the pairs of coaxial rollers 8 and 9 so that all the difficulties of a three-point suspension of the wheel, which is the usual construction in this art, are avoided.

A hopper 18 having very inclined walls is placed between the two frames 6 and 7. It communicates with an orientable conveyor 19 having an endless belt and mounted on the chassis in a position which is laterally and upwardly inclined.

The driving force for the moving parts of the excavator may be produced in the conventional manner by a hydraulic or electric unit 20 which supplies in particular the motor 17 and the driving motors 21 of the support means 2a and 2b which are driving means.

The position of the bucket-wheel may be adjusted with respect to the chassis 1, for example in accordance with the state and pressure of the pneumatic tires of the wheels 2a and 2b. This adjustment which is effected once and for all for a given work, is effected by actuating the cylinder devices 12 which operate through the wedges 11 to raise or lower the pivotal arms 10 and the upper support rollers 9. Thus it is possible to arrange that the scoops 14 define by their scooping action the level of the ground when they pass through a position in alignment with the axis X—X.

The construction according to the invention enables the bucket-wheel 5 to be mounted as near as possible to the wheels 2a and 2b, which considerably reduces the overhang of the whole of the wheel and of its support device. Consequently, the scooping force f in the region of the scoop 14 which attacks the slope T is transmitted to a much lesser extent to the machine than in the prior art.

Thus, for a force of for example 5 metric tons, in the region of the scoop, the bearing force of the machine on the ground is only about 30 tons for a weight of the whole machine of about 25 tons. Moreover, by means of the invention, it is possible to employ a bucket-wheel 5 whose diameter is much larger than that of the wheels in conventional machines. Thus, it is possible to design machines having a bucket-wheel of a diameter which may exceed up to 12 meters. This results in a much higher output of the apparatus (exceeding 2000 tons/hours), an improved flow of the products owing to the slopes of the hopper 18, lighter weight and a simpler construction.

Figure 4:
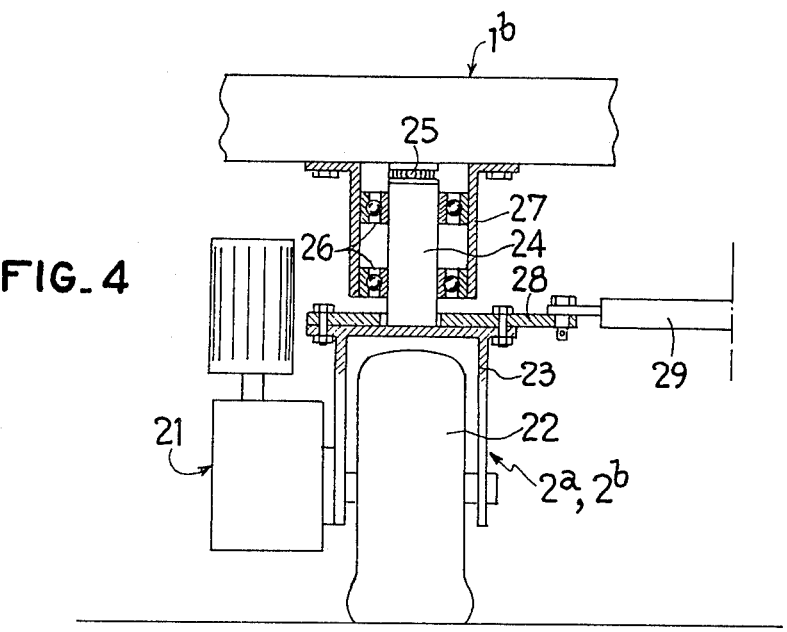
FIG. 4 is a partial sectional and elevational view of one of the support means of the machine.
Figure 5:
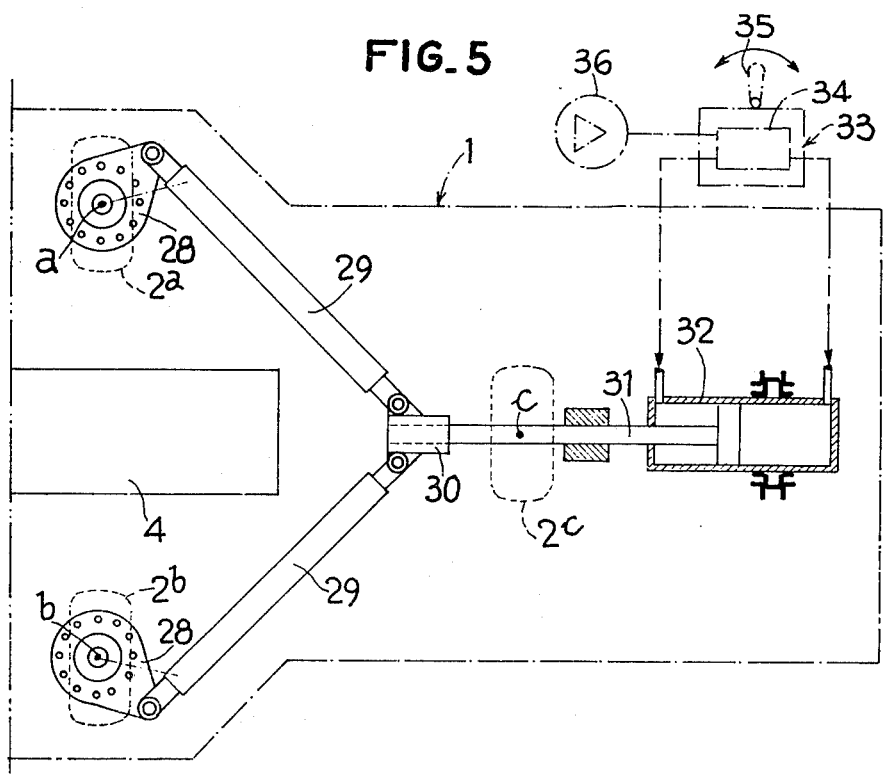
FIG. 5 is a partial diagrammatic view of means for regulating the orientation of the support means of the machine.
Figure 6:
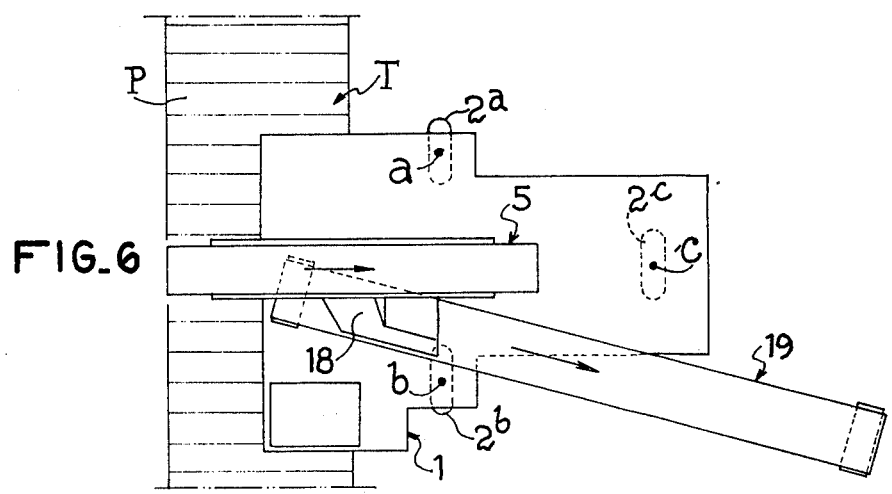
FIGS. 6 to 8 are diagrammatic plan views of the scooper-excavator illustrating the manner in which the latter moves in the course of its work.
Figure 7:
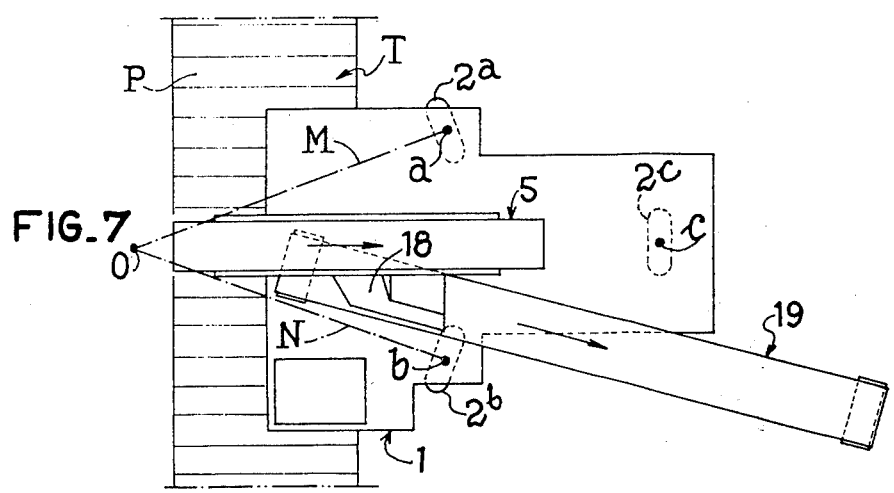
Figure 8:
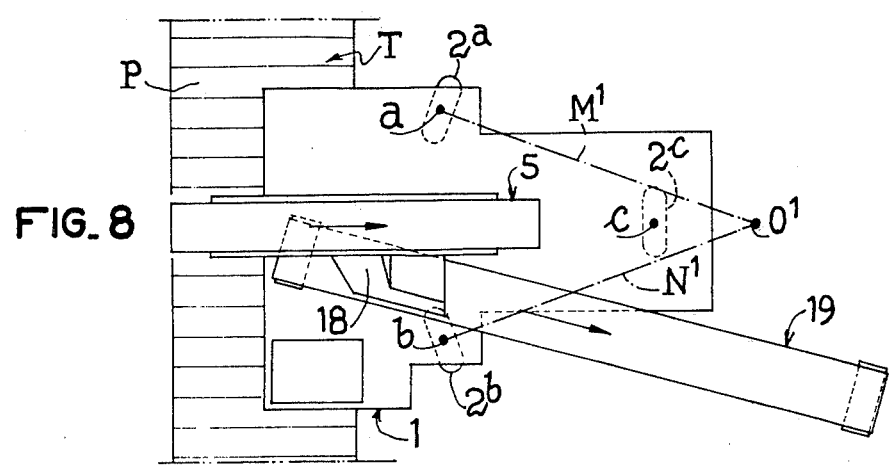
Figure 9:
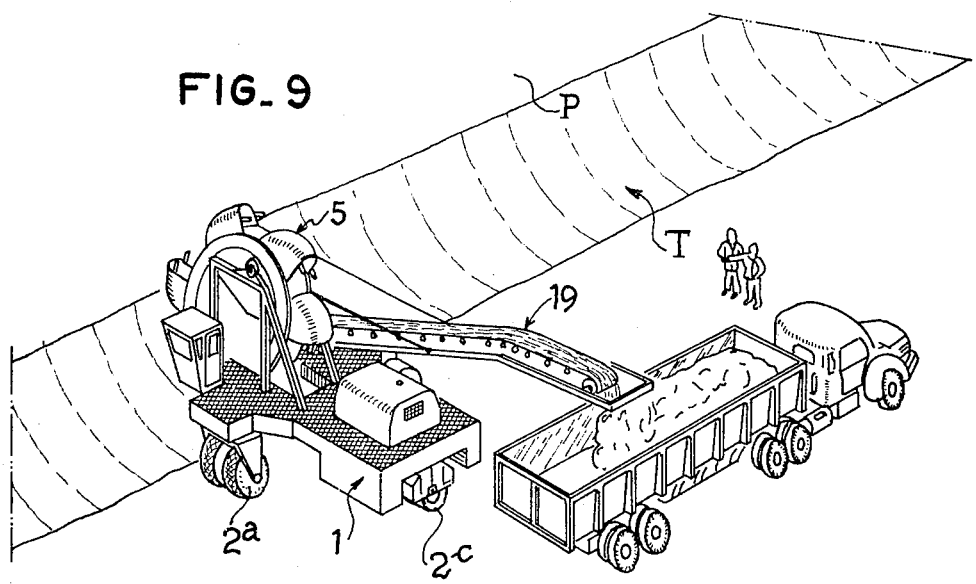
FIG. 9 is a perspective view of a scooper-excavator employed in a yard and having the configuration shown in dotted line in FIGS. 1 and 3.

FIGS. 4 and 5 show in more detail the construction of the means for regulating the orientation of the support means 2a and 2b. In FIG. 4, it can be seen that each of these support means comprises a pneumatic tire 22 which is mounted to rotate in a fork 23 to which a vertical pivot shaft 24 is fixed. The latter is connected to the chassis 1 by a thrust ball bearing 25. The shaft 24 is mounted in bearings 26 which are fixed in a sleeve 27 rigid with the chassis 1.

Horizontal plates 28 forming a lever are bolted to the fork 23. They are respectively connected to rods 29 which are interconnected on a swingle-bar 30. The latter is connected to the rod 31 of a double-acting cylinder device 32 mounted on the chassis 1. The double-acting cylinder device may be controlled by a manipulator 33 comprising a directional valve 34 actuated by a control lever 35 which is in the control cab of the machine. The valve 34 is supplied with fluid by the pump 36 of the hydraulic unit 20.

Figure 3:
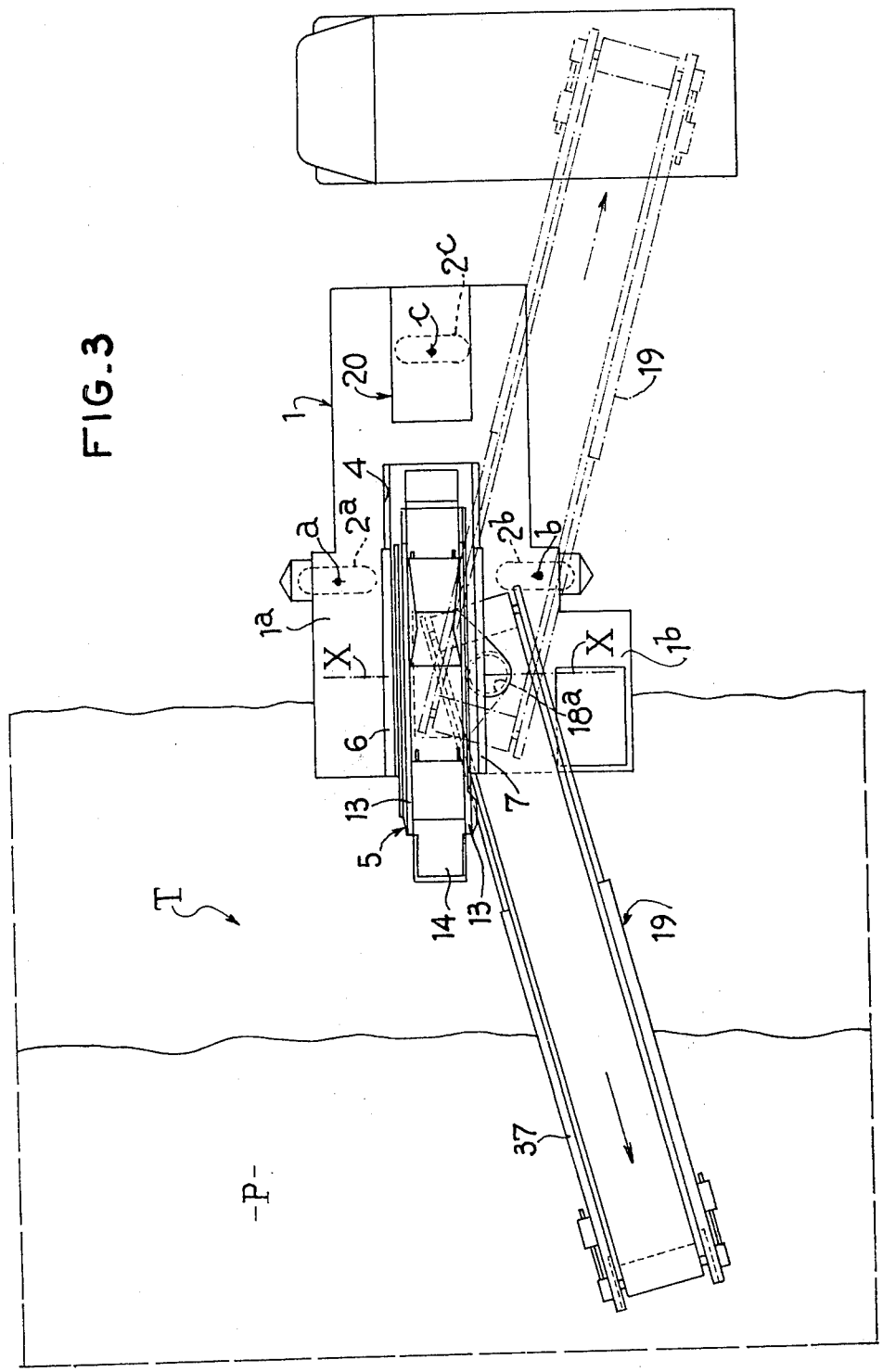
FIG. 3 is a plan view thereof.

FIGS. 1 and 3 show a particularly advantageous feature of the invention. Indeed, these Figures show that the device (frames 6 and 7) supporting the bucket-wheel on the chassis differs from that by means of which the discharging conveyor 19 is mounted on this chassis. This feature of the construction of the machine distinctly distinguishes it from conventional machines comprising a bucket-wheel mounted at the end of a boom. In such a conventional machine, the product discharging means comprise necessarily an endless conveyor which receives the product from the bucket-wheel for conveying it rearwardly along the boom. Consequently, in this case, it is not possible to discharge the product in the forward direction, for example for increasing the height of a heap by taking the product from the base of the latter.

Owing to the independence of the supports of the bucket-wheel on one hand and the conveyor on the other, the machine according to the invention may assume a plurality of configurations which may be fixed or adjustable. In the illustrated case, the second case has been chosen by way of example, although it is possible in a modification of the invention to render the conveyor 19 fixed relative to the chassis, in which case it extends forwardly and upwardly toward the heap of product. It can be seen that the endless conveyor 19 is orientable relative to the chassis 1. For this purpose it comprises a framework 37 on which the driving motor and the endless belt, which are conventional, are mounted. This framework is mounted on a rotary platform 38 which can be driven in rotation by a shaft 39 which is mounted vertically on the chassis 1. The platform is connected to rotate with a toothed crown wheel 40 which is driven by a motor-speed reducer unit 41.

Owing to this arrangement, it is possible to impart to the machine in particular the two particular configurations described hereinbefore (and if desired any intermediate position) which are obtained by acting on the motor-speed reducer 41 and are respectively shown in full lines and dotted lines in FIGS. 1 and 3.

In the configuration in full lines, the scooper-excavator can take up the product P at the base of the heap T and pour it onto the top of the heap. This configuration may be employed in particular if the product P is tipped onto a storage area by trucks for example, while the scooper-excavator raises the product so that it is stocked up to the maximum possible height.

In the configuration in dot-dash lines, the scooper takes up the product at the base of the slope T and pours it into trucks, or onto a conveyor, etc.

Note also that, in the case of a pivotable mounting of the conveyor, the hopper 18 has a circular outlet whose centre is located on the pivot axis of the framework 37 of the endless conveyor.

FIGS. 6 to 9 permit an examination of an example of the movements that the scopper-excavator effects on the ground during its operation.

Owing to the orientation of the support means 2a and 2b, the bucket-wheel passes in front of the slope by a movement of translation relative to itself while taking up the product P and conveying it by means of the conveyor 19 to a truck or other means (second configuration described hereinbefore).

As a passage across the front of the heap has been effected, the direction of travel of the machine must be reversed and the same depth of penetration of the bucket-wheel 5 into the slope T as before must be resumed. For this purpose, the wheels 2a and 2b are controlled as shown in FIG. 5 in such manner that their axes of rotation M and N intersect at a centre of rotation O located slightly beyond the slope T, for example, and on the axis of the wheel 2c which is not a steering wheel, whereas only the wheels 2a and 2b are driving and steering wheels, it being understood that their angular movement about the points a and b is equal but of opposite direction.

In order to then straighten the machine and thereby finish the movement of penetration of the latter, the wheels 2a and 2b are inverted so that the axes $M_1$ and $N_2$ of the wheels intersect at a centre of rotation of the machine which is located on the opposite side of the latter at $O_1$ which is also located on the axis of the wheel 2c. The wheels 2a and 2b are inclined to the same extent but in opposite directions. The machine can then work by effecting a new passage in front of the slope but in the opposite direction relative to the preceding passage.

Note that the operator may, during the travel of the machine, correct at each instant the path of the latter by acting on the orientation of the support means 2a and 2b by means of the lever 35. Moreover, the operator possesses another lever (not shown) by means of which he can act on the speed of rotation of the driving motors 21 of the support means 2a and 2b, which regulates the speed of travel of the machine.

Figure 10:
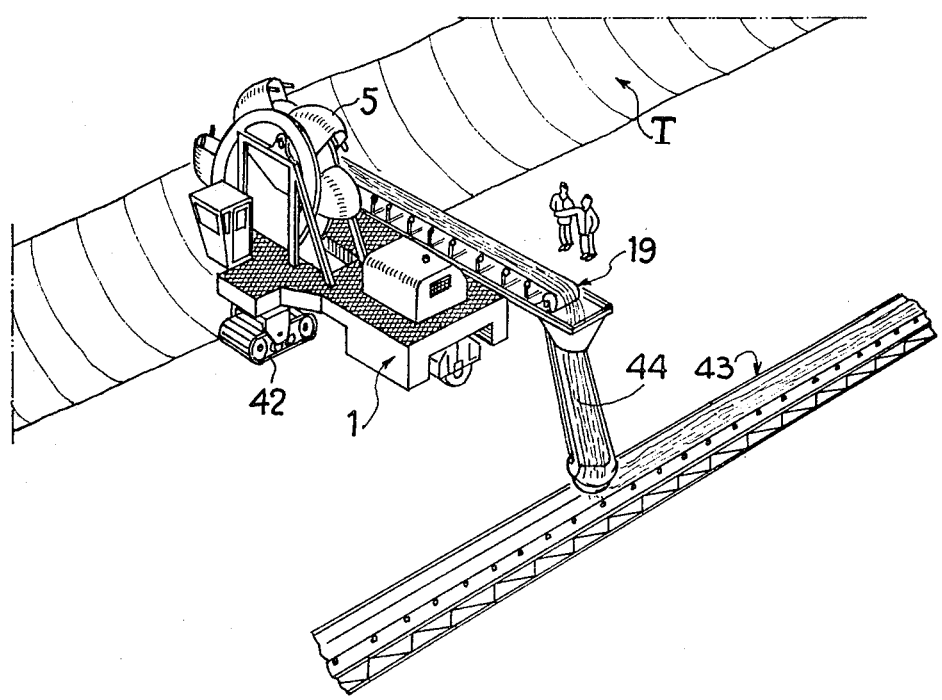
FIG. 10 is a perspective view of a modification of the machine according to the invention.

FIG. 10 shows a modification of the scooper-excavator according to the invention in which the latter, instead of having wheels on each side of the bucket-wheel 5, has trucks provided with articulated tracks 42. Further, this Figure also shows that the scooper-excavator may cooperate with an endless conveyor 43 which is placed alongside the heap T and is supplied with product by the discharging conveyor 19 through a pivotal arm 44.

Having now described my invention what I claim as new and desire to secure by Letters Patent is:

1. A self-propelling scooper-excavator machine comprising a chassis which comprises two branches and has substantially the shape of a U in a horizontal plane of the chassis, a bucket-wheel mounted to be rotatable about a horizontal axis which is fixed relative to said chassis, the bucket-wheel being located at least partly between the branches of the chassis, discharge means mounted on the chassis for discharging the product scooped by the bucket-wheel, three support means for the machine and defining in said horizontal plane three bearing points located at the corners of an isosceles triangle, two of the support means corresponding to the two corners at the base of the triangle being, in the course of operation of the machine, permanently driving means and orientable about respective vertical axes, said driving and orientable means being located on each side of the chassis and respectively associated with the branches of the chassis, means for orienting the respective driving support means and comprising an actuating device and mechanical connections connecting the actuating device to the respective driving support means, the orienting means further comprising a control device which is accessible to the operator and connected to the actuating device for achieving a permanent regulation of the orientation of the driving support means, the angle of orientation of one of the driving support means always being equal to and of opposite direction to that of the other driving support means.

2. A scooper-excavator as claimed in claim 1, wherein said discharging means comprise an endless conveyor and a support device mounts the conveyor on the chassis and is independent of a device whereby the bucket-wheel is mounted on the chassis, and a hopper puts the conveyor in communication with the bucket-wheel.

3. A scooper-excavator as claimed in claim 2, wherein the endless conveyor is fixed relative to the chassis and extends upwardly and forwardly toward the front of a heap of product when the machine is in a working position.

4. A scooper-excavator as claimed in claim 2, wherein the endless conveyor is fixed and extends rearwardly in an opposite direction to the front of a heap of product when the machine is in a working position.

5. A scooper-excavator as claimed in claim 2, wherein the hopper has an outlet and said conveyor is mounted to be pivotable relative to the chassis about a vertical axis passing through substantially the centre of the outlet of the hopper.

6. A scooper-excavator as claimed in claim 1, wherein said actuating device comprises a single cylinder device mounted on a longitudinal axis of said chassis and a force distributing device which connects the cylinder device to the orientable driving support means.

7. A scooper-excavator as claimed in claim 6, wherein said distributing device comprises a swingle-bar which is connected to said cylinder device and respective rods connect the swingle-bar to said orientable driving support means.

8. A scooper-excavator as claimed in any one of the claims 1 to 5, wherein said bucket-wheel is mounted on the chassis by a device for adjusting the position of the bucket-wheel relative to the plane of travel of the machine.

9. A scooper-excavator as claimed in any one of the claims 1 to 5, comprising two frames respectively extending substantially vertically from the branches of said chassis, each frame comprising an upper substantially horizontal branch and uprights, two pairs of rollers respectively mounted on the frames, one of the rollers of each pair being disposed on the substantially horizontal upper branch of the respective frame and the other roller of each pair being disposed on the upright of the respective frame adjacent to the slope to be worked upon by the bucket-wheel.

* * * * *